United States Patent Office 3,439,804
Patented Apr. 22, 1969

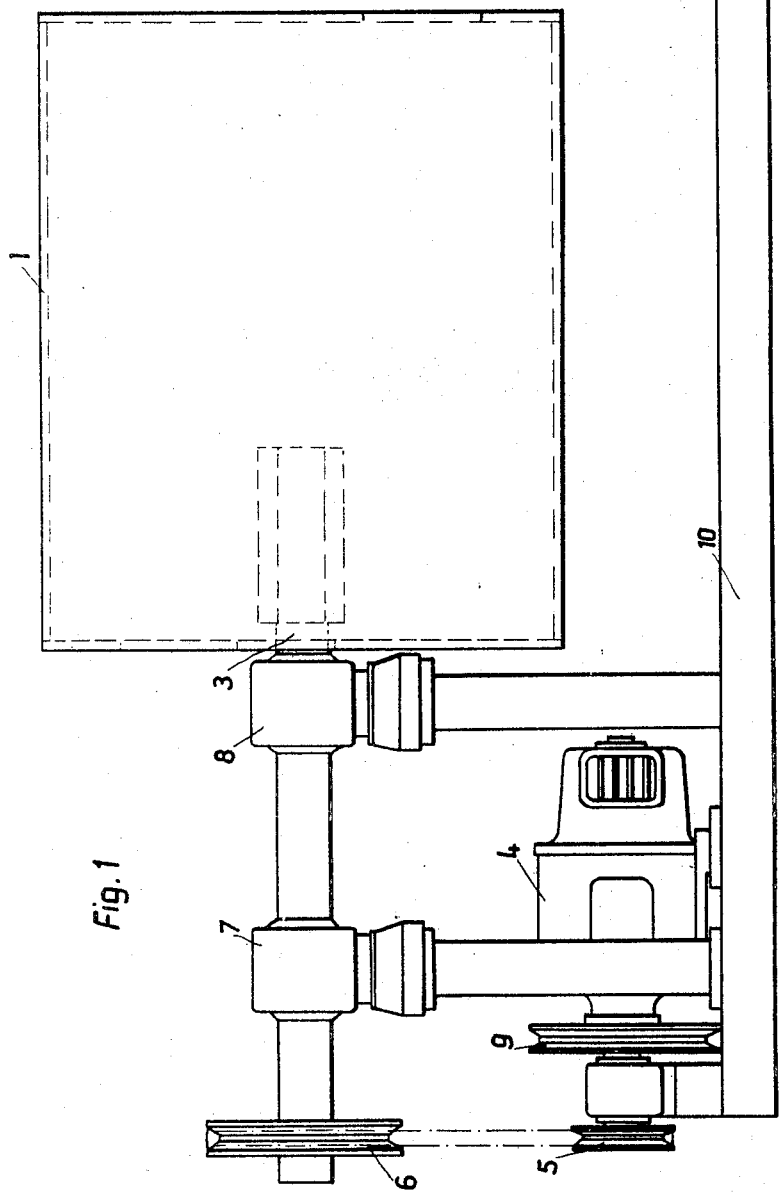

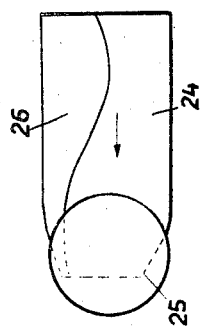
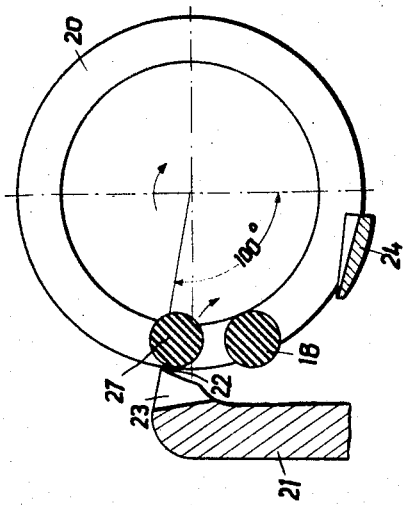
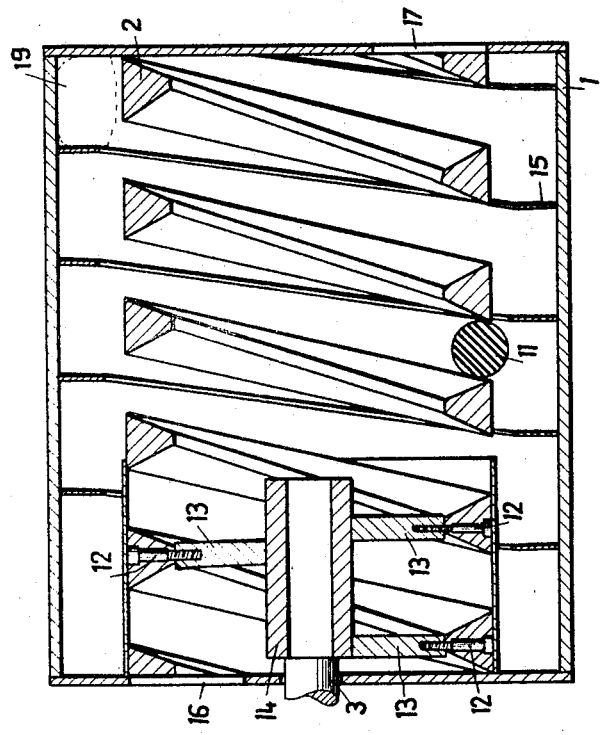

3,439,804
SORTING APPARATUS FOR SPHERICAL BODIES
Bernhard Hühndorf-Richter and Claus-Benedikt Von Der Decken, Aachen, Heinz Ohlig, Rheydt, and Wilfried Rausch, Dollweg, Germany, assignors to Brown Boveri/ Krupp Reaktorbau G.m.b.H., Dusseldorf, Germany
Filed June 29, 1965, Ser. No. 468,028
Claims priority, application Germany, July 1, 1964, B 77,475
Int. Cl. B07b 13/04; B07c 5/08
U.S. Cl. 209—86         8 Claims

ABSTRACT OF THE DISCLOSURE

A mixture of undamaged nuclear fuel beads, damaged beads, and fragments thereof are sorted in a sorting apparatus consisting of a rotatable helical guide having an input end and an output end and a plurality of turns spaced in such a manner that spherical bodies above a predetermined diameter are prevented from passing between the turns of the helical guide and are thus conducted from the input to the output end of the guide while damaged beads and fragments thereof fall out between the turns of the helical guide before reaching the output end of the guide.

---

The present invention relates generally to apparatus for separating spherical beads of prescribed diameter from beads having diameters deviating therefrom, for instance by virtue of damage sustained by their surfaces, and more particularly to apparatus for sorting from a mixture of particles, fuel elements in the form of spherical beads used in nuclear reactors.

Many types of nuclear reactors use spherical fuel elements encased in a graphite shell. If this graphite shell is damaged, the gas diffusion and mechanical properties of the fuel bead change considerably. It may, therefore, be necessary to remove beads which have sustained surface damage or which have changed their diameters from the nuclear reactor without regard to the degree of exhaustion or other properties of the fuel. In conjunction therewith, it is also advisable to remove from the bead mixture those fragments which have been produced as a result of damage sustained by the beads. The process of eliminating damaged beads and fragments from the reactor core must be remotely controlled because the material that requires sorting is generally highly radioactive.

It is the object of the present invention to provide apparatus that will permit a highly accurate separation of spherical beads of prescribed diameter from beads which have a damaged surface or diameters that have been reduced by abrasion. The characteristic feature of the proposed apparatus resides in the provision of a helical guide member rotatably drivable by a motor, in which the turns of the helix are appropriately spaced to retain beads of given diameter within the revolving helix as they are propelled from the entry to the outlet end of the helix. The helical guide element may be produced from a hollow cylinder having an internal thread, the peripheral surface being subsequently removed whereby only the thread remains in the form of an open helix with gaps of the required width between consecutive turns. In a further embodiment of the invention the helix is secured concentrically within a rotatable cylinder which on its inside peripheral wall has a helical channel for the reception of particles that pass through the spaces between the turns. This helical channel has turns of the same hand as the helix and conveys the particles to a separate outlet opening. The beads which are introduced into the interior of the guide member from one end of the cylindrical casing are slowly conveyed by the rotation of the casing and of the guide member towards the discharge end thereof. However, only those beads which are completely undamaged reach the discharge opening by remaining inside the helix, because the gap between the turns is of a width corresponding to their diameter. Beads with a damaged surface or of reduced diameter, as well as the other fragments and particles of the mixture, drop through the gap between the turns of the helix into the helical passage for their reception surrounding the helix.

Although the proposed apparatus may be of relatively short length, the beads nevertheless travel a sufficient distance to permit the whole of their surface to be explored because the beads roll as they travel along the length of the helix.

One end wall of the casing is provided with an entry opening through which beads are introduced into the casing. A similar opening for the discharge of undamaged beads leaving the helix is provided in the other end wall. Moreover, the casing is also provided with at least one opening for the discharge of beads that are damaged. In immediate proximity with the entry opening substantially exclusively fragments fall into the receiving channel surrounding the helix, whereas beads that are only slightly damaged tend to drop into the receiving channel later and nearer the discharge end of the apparatus.

The helical guide member and casing are preferably rotatably cantilevered from a support. If the apparatus is used in conjunction with a nuclear reactor the guide member is preferably located inside the reactor shield, whereas the driving motor for rotating the guide member and casing is arranged outside the shield. In this arrangement, the motor is more accessible and more readily maintained, and the part of the apparatus inside the reactor is compactly housed. It is desirable to provide the helical turns with a number of deflectors which function to rotate the beads in such manner that every part of the surface of each bead is tested by reference to the gap between the helix turns. For releasing beads that may have become jammed between the spaced turns of the helix, it is desirable to provide at least one stationary ejector formed with a point projecting toward the external periphery of the helix at an elevation above the horizontal plane containing the axis of the helix, the ejector point being slotted to permit the deflectors which are attached to the turns of the helix to pass through the ejector slot. In cooperation with the deflectors, the ejector functions to thrust beads that have become jammed between the helix turns radially inwardly into the helix interior. The cross section of each turn of the guide member is preferably trapezoidal, the non-parallel sides thereof converging inwardly toward the axis of rotation of the helix. However, a more rounded cross section providing a track of a section consisting of straight and arcuate portions is also within the scope of the present invention.

For some applications, it may be desirable to provide several guide members in tandem, the spacing distance between the turns of one member being different from that of the other. In such an arrangement the damaged beads and those of non-standard diameter can be separated in fractional stages. For instance, in a first stage comprising a guide member with closely spaced turns, all those beads that are far too small may be sorted out, whereas beads of standard diameter may be sorted out in a second stage and beads of excessive diameter in a third stage. Moreover, the apparatus may be arranged to permit the degree of roundness of the beads to be ascertained.

Other objects and advantages of the present invention will become apparent from a study of the following specification when considered in conjunction with the accompanying drawings, in which:

FIGURE 1 is a side elevation of apparatus according to the invention.

FIGURE 2 is a longitudinal detailed sectional view of the guide member and casing of the apparatus of FIGURE 1.

FIGURE 3 is a detailed cross-sectional view of a guide member provided with stationary ejector means in accordance with another embodiment of the invention.

FIGURE 4 is an enlarged detailed view of a deflector and a bead as viewed in the axial direction of the guide member.

The apparatus illustrated in FIGURE 1 comprises a rotary casing 1 in which is mounted a helical guide element 2. The casing and guide element 2 (FIGURE 2) are rotated simultaneously by a shaft 3 driven by a motor 4 via a belt transmission including pulleys 5 and 6. The drive shaft 3 is rotatably supported in bearings 7 and 8. For varying the speed of rotation, the shaft of motor 4 also carries a larger diameter pulley 9. The entire apparatus is mounted on a base plate 10.

FIGURE 2 is a longtiudinal sectional view of the helical guide member 2 and of the casing 1 in which it is contained. The turns of the helix are appropriately spaced to prevent a completely undamaged spherical fuel bead 11 from passing through the gap between adjacent turns. In the embodiment shown, the cross-sectional configuration of each turn of the helical guide member 2 is trapezoidal, the non-parallel sides converging inwardly toward the interior of the guide member. It is within the scope of the invention that the cross section may be varied from that illustrated; for example, in certain cases the cross section may be ovoid or pear-drop shaped. Three screw connector means 12, 13, rigidly secure the guide member 2 to a sleeve 14 which is secured upon the end of drive shaft 3.

The inside wall of the cylindrical casing 1 carries a likewise helically shaped partition element 15 which forms a helical channel surrounding the guide member 2 and whose outer periphery is secured to the inner surface of the cylindrical wall of the casing 1. The beads enter the interior of the guide member 2 through an opening 16 in the end wall of casing 1. A corresponding outlet opening 17 for the discharge of the beads that have travelled along the length of the guide member is provided in the wall at the opposite end of the casing 1. Moreover, an outlet opening 19 is provided in the cylindrical shell of casing 1 for discharging the fragments of broken beads or damaged beads that have dropped through the gap between the turns of the guide member.

The described apparatus operates as follows:

The mixture of particles, including the spherical beads that are to be sorted, enters the casing 1 through opening 16, whereupon the spherical beads drop between adjacent turns of the helical guide member 2. As the latter slowly rotates together with casing 1, the beads roll between the turns and slowly travel to the other end of the guide member 2 where the undamaged beads leave through the outlet opening 17. However, only those beads which have a completely undamaged surface will be retained within the turns until they reach opening 17. Other beads and fragments of beads will pass radially outwardly through the gaps between the turns into the helical peripheral channel inside casing 1. Fragments and badly damaged beads will drop out of the first few turns of the helix, whereas beads which exhibit but minor damage will be more likely to collect in the center portion of the peripheral channel of casing 1. Only a few beads will drop out of the last few turns of the guide member 2. The helical conformation of the peripheral channel in casing 1 causes the damaged beads and fragments to travel in the same direction as the undamaged beads and they will eventually leave casing 1 through opening 19. However, for separating the damaged beads into different grades, a plurality of axially-spaced outlet openings 19 may be provided in the cylindrical wall of the casing 1.

FIGURE 3 illustrates an improved form of construction which permits a bead 18 that has become wedged between adjacent turns of the helix to be pushed back into the interior of guide member 2. Such a bead 18 is carried upwards between the turns 20 of the guide member 2 as it revolves, as indicated, in the clockwise direction. The point 22 of a fixed ejector 21, attached, for example, to a stationary casing or to a stationary support when the casing 1 is omitted, is so located that it precisely aligns with the outer periphery of the rotating guide member 20 in a plane above the horizontal plane containing the axis of the guide member. The point 22 of this ejector 21 is slotted at 23. Affixed to the turns of the helical guide member 2 and located in the gap between adjacent turns are a plurality of deflectors 24 which rotate together wtih the guide member. These deflectors 24, which have a deflecting surface directed toward the interior of the guide member, are received by the slot in the ejector during rotation of the helix.

When, in the course of rotation, a deflector 24 advances towards a bead, such as bead 25 in FIGURE 4, a convex face 26 lifts the bead and rotates it about its center in such manner that when the deflector 24 has passed underneath the bead different parts of the surface of the bead will roll on the helical turns. This arrangement ensures that the entire surface of the bead is progressively explored for defects as it rolls in the helical turns. The deflectors 24 project from the turns and pass through the slot 23 in the point of the ejector 21 as they travel around. A sphere 18 (cf. FIGURE 3) which may have become jammed between the turns of the guide member, such as bead 18, will then be released and ejected into the interior of the guide member 2. This ejecting action is illustratively shown in the case of a bead 27 in the drawing. The cooperation of deflectors 24 and ejector 21 avoids a jammed fuel bead from being crushed when it is released.

It will be understood that the above description of the present invention is susceptible to various modifications, changes, and adaptations, and the same are intended to be comprehended within the meaning and range of equivalents of the appended claims. For example, the apparatus may have a plurality of helical guide members 2 and/or 15 arranged in tandem, each member having turns that are differently spaced, the spacing of the turns of the first guide member at the entry end of the spheres or beads to the apparatus being narrower than that of the turns of the following guide members. By arranging appropriate outlet openings in the cylindrical wall of the casing, it is possible with such an apparatus to separate damaged beads and those of varying diameters in stages to a desired degree of tolerance.

It is furthermore possible axially to telescope the several guide members.

What is claimed is:

1. Apparatus for separating from a mixture of spherical and non-spherical beads those spherical beads whose diameters exceed a given value, comprising, in combination:
   (a) a cylindrical hollow casing mounted for rotation about its longitudinal axis;
   (b) a helical guide member arranged coaxially within and spaced concentrically from the cylindrical wall of said casing, said guide member being connected with said casing for simultaneous rotation therewith, said guide member including a plurality of turns which are spaced apart to prevent the passage between said turns of only those beads whose diameter exceeds said given value, in consequence of which beads having a cross-sectional dimension less than said given value will, upon rotation of said guide member pass radially outwardly through the spaces between said turns while those spherical beads whose diameter exceeds said given value will remain within said helical guide member;
   (c) means carried by said casing defining a helical chamber between and concentric with said cylindrical wall and said helical guide member, said helical chamber having the same direction of helical turns as, and being in direct communication along its inner periphery with the spaces between the turns of said helical guide member;

(d) means for introducing the mixture into one end of said helical guide member;

(e) first discharge means for discharging from the casing via the other end of said helical guide member those spherical beads whose diameter exceeds said given value; and (f) second discharge means communicating with said helical chamber for discharging from the casing those beads having a cross-sectional dimension less than said given value.

2. Apparatus as defined in claim 1, wherein said means defining said helical chamber comprises a helical partition the outer periphery of which is secured to the inner surface of said cylindrical wall.

3. Apparatus as defined in claim 1, further comprising a plurality of spaced apart deflector means secured to said helical guide member between the turns thereof, respectively, each of said deflector means including a surface having a configuration to deflect radially inwardly those beads that are conveyed by said helical guide member toward said first discharge means.

4. Apparatus as defined in claim 1, wherein the axis of said casing and helical guide member is horizontal and further including stationary ejector means for removing those spherical beads that are jammed between the turns of said helical guide member, said ejector means including a pointed portion directed toward and adjacent the outer periphery of said guide member, said pointed portion being above the horizontal plane containing the axis of said helical guide member.

5. Apparatus as defined in claim 4, and further including a plurality of spaced apart deflector means secured to said helical guide member between the turns thereof, respectively, each of said deflector means including a surface having a configuration to deflect radially inwardly those beads that are conveyed by said guide member toward said first discharge means, said ejector pointed portion containing one vertical slot through which at least one of said deflector means passes during rotation of said guide member.

6. Apparatus for separating spherical bodies having a predetermined diameter and a substantially uniform surface curvature over the entire surface thereof from similar spherical bodies having the same diameter but which are flattened at one or more points on the surface thereof, said apparatus comprising, in combination:

(a) rotatable helical guide means having an input end into which such spherical bodies can be introduced and an output end from which such spherical bodies can be discharged, said helical guide means having a plurality of turns spaced in such a manner that bodies which are at least as wide as said predetermined diameter will be supported between adjacent turns of said helical guide means and bodies which are narrower than said predetermined diameter will drop out of said helical guide means between adjacent turns thereof;

(b) means for rotating the helical guide means in such direction as to impart a rolling motion to spherical bodies introduced into the input end thereof and to roll such spherical bodies between adjacent turns of said helical guide means toward the output end thereof; and (c) means for imparting a twisting motion as well as a rolling motion to such spherical bodies as they move from the input end of said helical guide means toward the output end thereof, whereby spherical bodies which are flattened at one or more points on the surface thereof will drop out between adjacent turns of said helical guide means before reaching the output end thereof and only those spherical bodies which have a substantially uniform surface curvature over the entire surface thereof will reach the output end of said helical guide means, said means for imparting a twisting motion to such spherical bodies comprising a plurality of spaced deflector means connected to said helical guide means between the turns thereof, each of said deflector means having a surface which is positioned to contact such spherical bodies as they roll past said deflectors and to impart a twisting movement thereto in addition to said rolling movement thereof.

7. Apparatus as defined in claim 6 wherein each turn of said helical guide member has in cross section the configuration of a trapezoid the converging walls of which are directed radially inwardly toward the axis of said helical guide member.

8. Apparatus as defined in claim 6 wherein said deflector means has a curved guide surface whose center of curvature is substantially tangential to the helical guide line of such spherical bodies between the turns of said helical guide means.

References Cited

UNITED STATES PATENTS

| 1,668,626 | 5/1928 | Brandt | 209—86 |
| 2,398,955 | 4/1946 | O'Toole | 209—86 X |
| 2,478,246 | 8/1949 | Cortese et al. | 209—95 |

FOREIGN PATENTS

| 12,318 | 1/1903 | Norway. |

M. HENSON WOOD, Jr., *Primary Examiner.*

R. A. SCHACHER, *Assistant Examiner.*

U.S. Cl. X.R.

209—97

UNITED STATES PATENT OFFICE

CERTIFICATE OF CORRECTION

Patent No. 3,439,804          Dated April 22nd, 1969

B. Hühndorf-Richter et al

It is certified that error appears in the above-identified patent and that said Letters Patent are hereby corrected as shown below:

In the heading of the patent, line 5, change "Dollweg" to --Strass b. Gey/Düren--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents